United States Patent
Kawai et al.

(10) Patent No.: US 10,146,707 B2
(45) Date of Patent: Dec. 4, 2018

(54) HARDWARE-BASED MEMORY PROTECTION

(71) Applicant: International Business Machines Corporation, Armonk, NY (US)

(72) Inventors: Yutaka Kawai, Tokyo (JP); Masanori Mitsugi, Yamato (JP); Makoto Ogawa, Sagamihara (JP); Hiroyuki Tanaka, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/458,961

(22) Filed: Mar. 14, 2017

(65) Prior Publication Data

US 2018/0267905 A1   Sep. 20, 2018

(51) Int. Cl.

| G06F 12/00 | (2006.01) |
|---|---|
| G06F 12/14 | (2006.01) |
| G06F 3/06 | (2006.01) |
| G06F 12/1009 | (2016.01) |
| G06F 9/455 | (2018.01) |

(52) U.S. Cl.
CPC ........ *G06F 12/1475* (2013.01); *G06F 3/0622* (2013.01); *G06F 3/0659* (2013.01); *G06F 3/0673* (2013.01); *G06F 9/45558* (2013.01); *G06F 12/1009* (2013.01); *G06F 2009/45583* (2013.01); *G06F 2212/1052* (2013.01)

(58) Field of Classification Search
CPC .......... G06F 9/4558; G06F 2212/1052; G06F 2009/45583; G06F 12/1475; G06F 12/1009; G06F 3/0622; G06F 3/0659; G06F 3/0673
See application file for complete search history.

(56) References Cited

U.S. PATENT DOCUMENTS

| 5,163,096 A | 11/1992 | Clark et al. | |
|---|---|---|---|
| 2008/0222397 A1* | 9/2008 | Wilkerson | G06F 12/145 |
| | | | 712/220 |
| 2013/0152209 A1 | 6/2013 | Baumann et al. | |
| 2015/0212740 A1* | 7/2015 | Dewey | G06F 3/0659 |
| | | | 711/171 |

(Continued)

OTHER PUBLICATIONS

Nagarakatte et al., Watchdog: Hardware for Safe and Secure Manual Memory Management and Full Memory Safety, 2012.*

(Continued)

*Primary Examiner* — Kalpit Parikh
(74) *Attorney, Agent, or Firm* — Grant M. McNeilly

(57) ABSTRACT

Disclosed aspects relate to hardware-based memory protection of a container-based virtualization environment. A set of access identifiers for a container of a kernel process related to a memory component may be established. An access request from a first user process to a first portion of the memory component may be received. A first candidate access identifier for the first portion of the memory component may be detected. A first access identifier of the set of access identifiers that corresponds to the first portion of the memory component may be identified. A hardware-based memory protection response operation may be determined. The hardware-based memory protection response operation may be carried-out.

17 Claims, 11 Drawing Sheets

(56) References Cited

U.S. PATENT DOCUMENTS

2016/0182540 A1    6/2016  Ghosh et al.

OTHER PUBLICATIONS

Mell, Peter, et al., The NIST Definition of Cloud Computing, National Institute of Standards and Technology, Oct. 7, 2009, Version 15, NIST, Gaithersburg, MD, US.
Capelis, DJ; "Lockbox: Helping Computers Keep Your Secrets"; University of California, Santa Cruz; Nov. 2015.

* cited by examiner

HARDWARE-BASED MEMORY PROTECTION

BACKGROUND

This disclosure relates generally to computer systems and, more particularly, relates to hardware-based memory protection of a container-based virtualization environment. The amount of memory being used in container-based virtualization environments is increasing. As memory being used increases, the need for hardware-based memory protection of a container-based virtualization environment may also increase.

SUMMARY

Aspects of the disclosure relate to hardware-based memory protection of a container-based virtualization environment. A storage protection key technique may be utilized with respect to a container-based virtualization environment to facilitate memory protection. Storage protection keys may be established for memory components of the container-based virtualization environment such that access to a memory component is only allowed to processes that provide the particular key for that memory component. The storage protection keys may be managed by hardware registers to positively impact memory access overhead and avoid the need for multithreading locks. The storage protection key may allow read-only access to be set to a memory, such that one container may perform, monitor, and manage read-only access of other containers of the container-based virtualization environment.

Disclosed aspects relate to hardware-based memory protection of a container-based virtualization environment. A set of access identifiers for a container of a kernel process related to a memory component may be established. An access request from a first user process to a first portion of the memory component may be received. A first candidate access identifier for the first portion of the memory component may be detected. A first access identifier of the set of access identifiers that corresponds to the first portion of the memory component may be identified. A hardware-based memory protection response operation may be determined. The hardware-based memory protection response operation may be carried-out.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
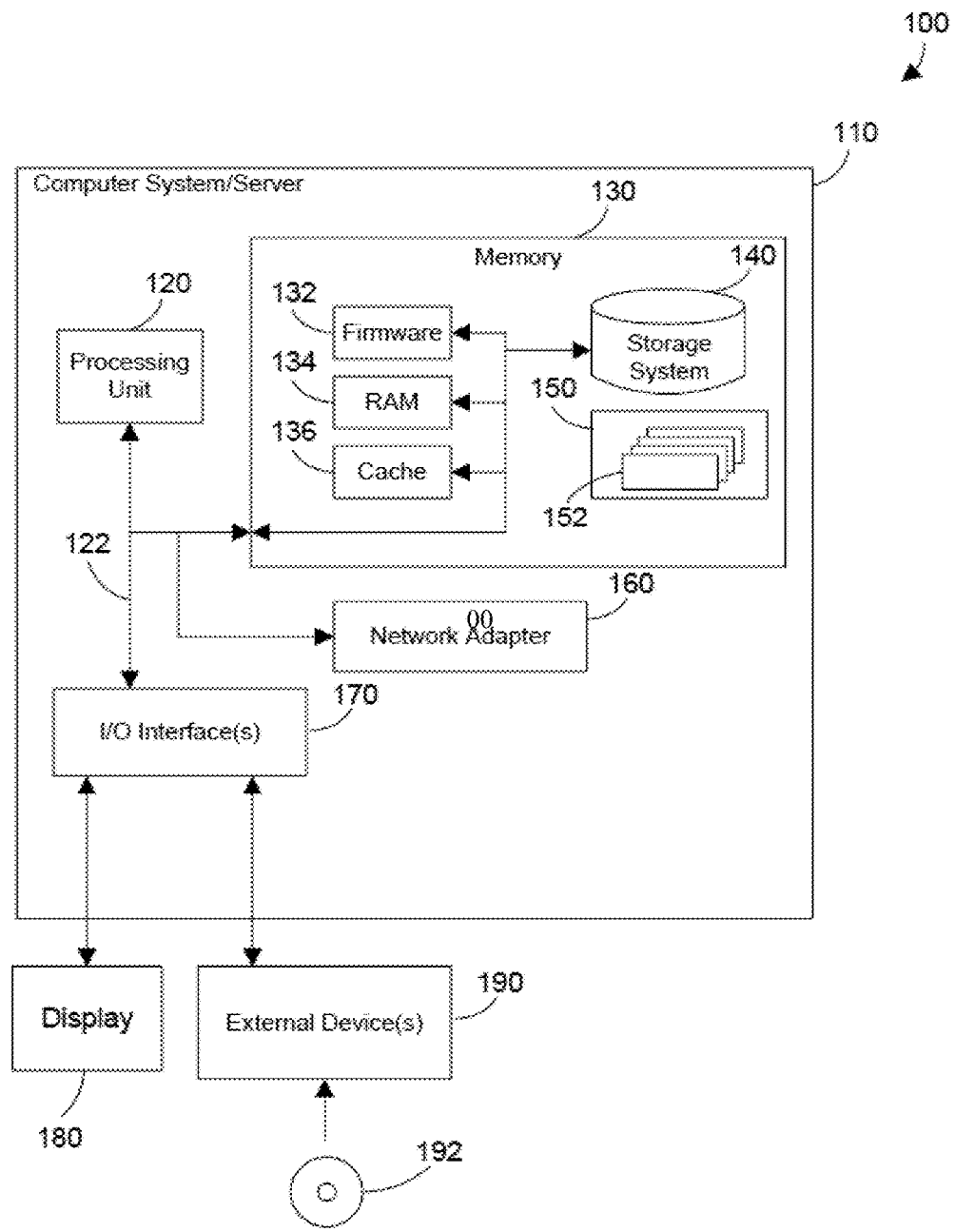
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to hardware-based memory protection of a container-based virtualization environment. A storage protection key technique may be utilized with respect to a container-based virtualization environment to facilitate memory protection. Storage protection keys may be established for memory components of the container-based virtualization environment such that access to a memory component is only allowed to processes (e.g., user processes, kernel processes, hypervisor processes) that provide the particular key for that memory component. The storage protection keys may be managed by hardware registers (e.g., access to a memory component may be granted or prevented based on a logical sum of bits) to positively impact memory access overhead and avoid the need for multithreading locks. The storage protection key may allow read-only access to be set to a memory, such that one container may perform, monitor, and manage read-only access of other containers of the container-based virtualization environment. Altogether, leveraging usage of storage protection keys with respect to container-based virtualization environment may be associated with benefits including data security, memory accessibility, and operational performance.

Container-based virtualization is one virtualization method in which a kernel of an operating system may be used to create multiple isolated instances for hosting of user applications. Aspects of the disclosure relate to the recognition that, in some situations, resource separation between instances may be implemented by software, resulting in challenges associated with protecting the memory of the container (e.g., software implementation may be associated with errors, instability, or buffer overflows that impact existing instances). Accordingly, aspects of the disclosure relate to hardware-based memory protection of a container-based virtualization environment using a set of storage protection keys. Individual storage protection keys may be established for one or more memory components of the container, such that only those processes that provide the particular key for that memory component are allowed access to the memory component of the container. The storage protection keys may be stored as bits in hardware registers to positively impact memory access overhead and avoid the need for multithreading locks. In this way, the memory components of the container may be protected from access by unauthorized processes as well as software anomalies, facilitating virtual instance stability and memory security in the container-based virtualization environment.

Aspects of the disclosure include a method, system, and computer program product for hardware-based memory protection of a container-based virtualization environment. A set of access identifiers for a container of a kernel process related to a memory component may be established. An access request from a first user process to a first portion of the memory component may be received. A first candidate access identifier for the first portion of the memory component may be detected. A first access identifier of the set of access identifiers that corresponds to the first portion of the memory component may be identified. A hardware-based memory protection response operation may be determined. The hardware-based memory protection response operation may be carried-out.

In embodiments, the first candidate access identifier and the first access identifier may be compared to determine the hardware-based memory protection response operation which pertains to the first portion of the memory component associated with the container-based virtualization environment. In embodiments, a hardware-based memory protection allowance operation which pertains to the first portion of the memory component may be determined by the processor hardware memory management engine based on the first candidate access identifier and the first access identifier, and the hardware-based memory protection allowance operation may be carried-out by the processor hardware memory management engine. In embodiments, a hardware-based memory protection disallowance operation which pertains to the first portion of the memory component may be determined by the processor hardware memory management engine based on the first candidate access identifier and the first access identifier, and the hardware-based memory protection disallowance operation may be carried-out by the processor hardware memory management engine. In embodiments, a group of hardware registers which have the set of access identifiers may be configured using a kernel process to manage access authority of the first user process to the memory component, and the hardware-based memory protection response operation may be determined based on the first candidate access identifier and the first access identifier of a first hardware register of the group of hardware registers. Altogether, aspects of the disclosure can have performance or efficiency benefits. Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
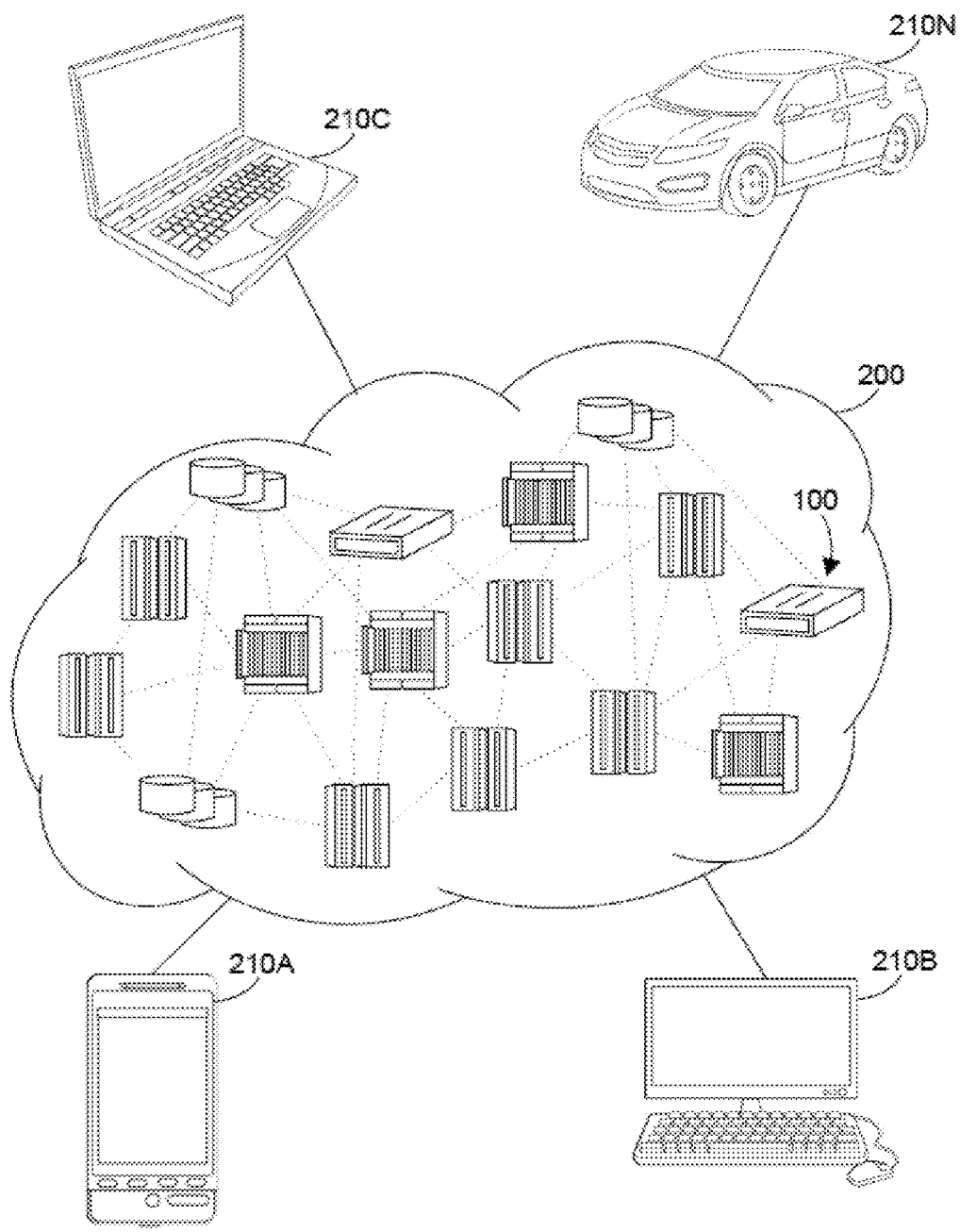
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
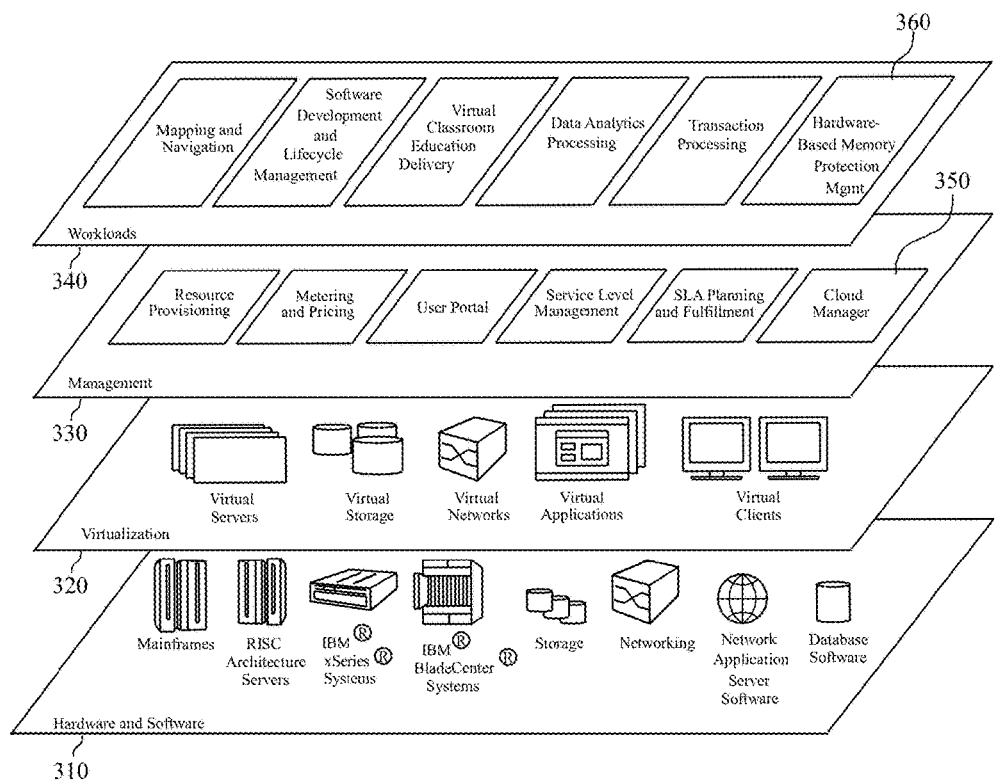
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and hardware-based memory protection management 360, which may be utilized as discussed in more detail below. Other possibilities are considered such as, in embodiments, the hardware-based memory protection management 360 may be included in the management layer 330.

Figure 4:
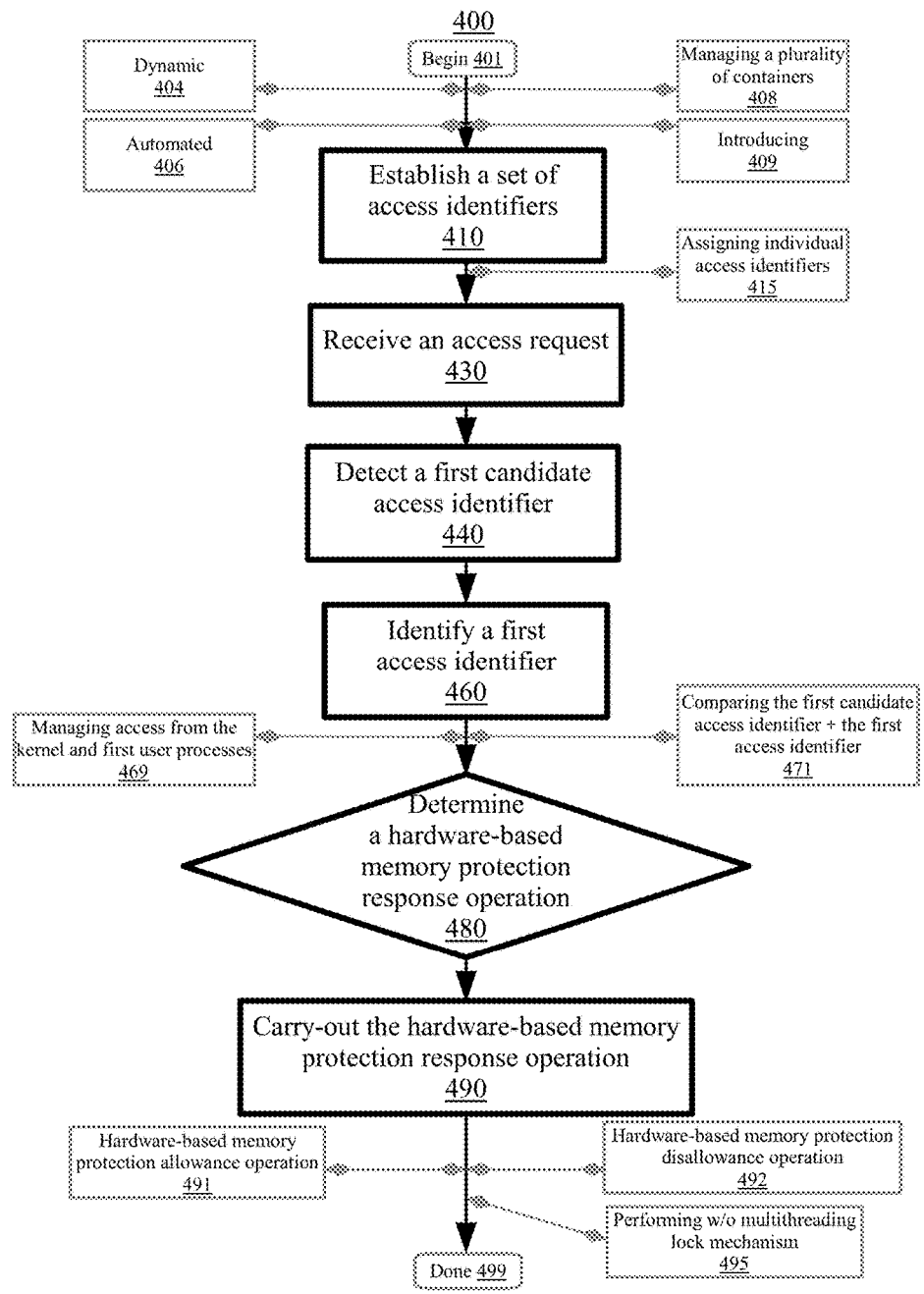
FIG. 4 is a flowchart illustrating a method for hardware-based memory protection of a container-based virtualization environment, according to embodiments.

FIG. 4 is a flowchart illustrating a method 400 for hardware-based memory protection of a container-based virtualization environment, according to embodiments. Aspects of the method 400 relate to determining and carrying-out a hardware-based memory protection response operation with respect to a container-based virtualization environment. Generally, container-based virtualization may refer to an operating-system level virtualization method for deploying and running distributed applications without launching a virtual machine for each application. One or more isolated systems called containers may run on a single control host and access a single kernel. Containers may include the files, environment variables, libraries, and other components used to run desired software. The containers may include one or more memory components. The memory components may include memory resources allocated by the kernel for use by the container. The memory component may include one or more portions. The one or more portions may include segments, pieces, parts, sections, or partitions of the memory component that are used for particular functions within the container. For instance, each portion may be designated for use by a particular user application hosted by the container. The kernel may include a computer program that represents the core of an operating system. The kernel may handle start-up processes, input/output requests from software, memory/peripherals, and access to system resources by programs. The kernel may be configured to manage scheduling and execution of one or more kernel processes. A kernel process may include a set of tasks, commands, directives, instructions, or other instances of a computer program that are performed by the kernel (e.g. in kernel space). As examples, kernel processes may include tasks to allow programs to access main memory, central processing unit (CPU) resources, or other system resources, task scheduling, device management, system calls, or the like. Altogether, leveraging usage of a hardware-based memory protection response operation with respect to container-based virtualization environment may be associated with benefits including data security, memory accessibility, and operational performance. The method 400 may begin at block 401.

In embodiments, the establishing, the receiving, the detecting, the identifying, the determining, the carrying-out, and the other steps described herein may be executed in a dynamic fashion at block 404. The steps described herein may be performed in a dynamic fashion to streamline hardware-based memory protection of the container-based virtualization environment. For instance, the establishing, the receiving, the detecting, the identifying, the determining, the carrying-out, and the other steps described herein may occur in real-time, ongoing, or on-the-fly. As an example, one or more steps described herein may be performed on-the-fly (e.g., hardware-based protection response operations may be dynamically determined based on the first candidate access identifier and the first access identifier) in order to streamline (e.g., facilitate, promote, enhance) hardware-based memory protection of the container-based virtualization environment. Other methods of performing the steps described herein are also possible.

In embodiments, the establishing, the receiving, the detecting, the identifying, the determining, the carrying-out, and the other steps described herein may be executed in an automated fashion at block 406. The steps described herein may be performed in an automated fashion without user intervention. In embodiments, the establishing, the receiving, the detecting, the identifying, the determining, the carrying-out, and the other steps described herein may be carried out by an internal virtual container management module maintained in a persistent storage device of a locale computing device (e.g., network node). In embodiments, the establishing, the receiving, the detecting, the identifying, the determining, the carrying-out, and the other steps described herein may be carried out by an external virtual container management module hosted by a remote computing device or server (e.g., server accessible via a subscription, usage-based, or other service model). In this way, aspects of hardware-based memory protection of a container-based virtualization environment may be performed using automated computing machinery without manual action. Other methods of performing the steps described herein are also possible.

In embodiments, a plurality of containers of the kernel process related to the memory component associated with the container-based virtualization environment may be managed at block 408. The managing may be performed using the processor hardware memory management engine for hardware-based memory protection of the container-based virtualization environment. Generally, managing can include governing, overseeing, handling, controlling, administering, regulating, supervising, or otherwise operating the plurality of containers of the kernel process related to the memory component associated with the container-based virtualization environment. In embodiments, aspects of the disclosure relate to a container-based virtualization environment in which a plurality of containers may exist for a kernel process. For instance, a single kernel process may be used to host multiple containers, where each container supports one or more guest applications that share the same operating system instance. In embodiments, managing the plurality of containers may include utilizing a hypervisor to assign an access key to a user authority mask override register (UAMOR) of each container, and using the UAMOR to store the access key independently from the access keys of other containers. In this way, the UAMOR for each container may be individually managed to facilitate data security of the memory components of each container. Other methods of managing the plurality of containers of the kernel process related to the memory component associated with the container-based virtualization environment are also possible.

In embodiments, hardware-based memory protection of the container-based virtualization environment may be introduced at a hardware-level at block 409. The introducing may be performed using one or more labels to indicate one or more relationships with one or more portions of the memory component. Generally, introducing can implementing, initiating, instantiating, including, or otherwise establishing the hardware-based memory protection of the container-based virtualization environment using labels to indicate relationships with one or more portions of the memory component. In embodiments, aspects of the disclosure relate to implementing memory protection for memory of a container at a hardware-level (e.g., as opposed to software). For instance, access identifiers (e.g., storage protection keys) for memory components of the containers may be maintained in hardware registers such that memory access protection may be implemented through memory virtualization of the processor. In embodiments, labels may be used to indicate relationships with one or more portions of the memory component. The labels may include tags, flags, markers, or other identifiers that indicate the degree of access that a particular process, application, hardware component, or user has with respect to portions of the memory component. As an example, introducing hardware-based memory protection of the container-based virtualization environment may include assigning a first label to a particular process that indicates that the particular process may be associated with "read-only access" to a first portion of the memory component, and "read and write access" to a second portion of the memory component. In certain embodiments, the labels may be used to specify processes, application, components, or users that have ownership (e.g., responsible for creation of management) of a portion of the memory component. Other methods of introducing hardware-based memory protection of the container-based virtualization environment using one or more labels are also possible.

At block 410, a set of access identifiers for a container of a kernel process may be established. The kernel process may relate to a memory component associated with the container-based virtualization environment. The establishing may be performed as part of hardware-based memory protection of the container-based virtualization environment. Generally, establishing can include creating, instantiating, formulating, structuring, producing, or otherwise generating the set of access identifiers for the container of a kernel process. The set of access identifiers may include words, character strings, passwords, or other keys that may be used for authentication or access approval to gain access to a resource of a container (e.g., memory component or portion of a memory component). In embodiments, the set of access identifiers may be implemented as storage protection keys. For instance, each virtual memory page (e.g., of a memory component of a container) may be assigned an integer protection key which represents a required access authority to enable read or write operations with respect to the virtual memory page. The set of access identifiers may be encoded as one or more bits stored in a hardware register. For instance, the set of access identifiers may include a pair of 32-bit values, wherein the first bit of the pair is used to validate write access and the second bit of the pair is used to validate read access. In embodiments, establishing the set of access identifiers may include generating a series of access identifiers for a set of portions of the memory component using a kernel processor, hypervisor, or user-input. As an example, an access identifier having a first 32-bit sequence of "00000000000100000000000000000000" and a second 32-bit sequence of 00000000000000000000000000001000 may be generated for a first portion of a memory component of a container of the container-based virtualization environment. Other methods of establishing the set of access identifiers for a container of a kernel process are also possible.

In embodiments, individual access identifiers of the set of access identifiers may be assigned to individual portions of the memory component associated with the container-based virtualization environment at block 415. The assigning may be performed using a page table entry. Generally, assigning can include specifying, appointing, distributing, allocating, attaching, associating, or otherwise designating individual access identifiers of the set of access identifiers to individual portions of the memory component using the page table entry. The page table entry may include a data structure used by a virtual memory system in a computer operating system to store the mapping between virtual addresses and physical addresses. In embodiments, assigning the individual access identifiers to individual portions of the memory component may include creating a page table entry within the page table that links a particular portion of the memory component with a particular access identifier. As an example, a first access identifier of "00100000000000000000000000000000: 00000000000000000000000000000000" may be registered (e.g., mapped) to a first portion of a memory component of the container, such that the first access identifier may be used to authenticate access to the first portion of the memory component. In embodiments, the first access identifier of the set of access identifiers that corresponds to the first portion of the memory component associated with the container-based virtualization environment may be identified. The identifying may be performed by the processor hardware memory management engine using the page table entry. Generally, identifying can include detecting, recognizing, sensing, discovering, resolving, ascertaining, or otherwise determining the first access identifier of the set of access identifiers that corresponds to the first portion of the memory component. In embodiments, identifying may include locating the page table entry within the page table that includes the access identifier corresponding to the first portion of the memory component. As an example, the processor hardware memory management engine may scan the page table (e.g., in response to receiving an access request), and detect the page table entry that includes the first access identifier of "00100000000000000000000000000000: 00000000000000000000000000000000" that corresponds to the first portion of the memory component. Other methods of identifying the first access identifier of the set of access identifiers that corresponds to the first portion of the memory component are also possible.

At block 430, an access request may be received. The access request may be received from a first user process to a first portion of the memory component associated with the container-based virtualization environment. The receiving may be performed by a processor hardware memory management engine. Generally, receiving can include detecting, sensing, discovering, recognizing, resolving, identifying, or otherwise accepting delivery of the access request from the first user process. The access request may include a query, appeal, command, instruction, or other petition for authorization to access the first portion of the memory component. The access request may be received from a first user process. The first user process may include a set of tasks, commands, directives, instructions, or other instances of a computer program that are initiated (e.g., put in motion by) a user. As an example, the first user process may include an instruction to execute a piece of software that is stored in the first portion of the memory component. In embodiments, receiving the access request may include using the processor hardware memory management engine to detect an access request with respect to the first portion of the memory component. The processor hardware memory management engine may include a hardware component that is configured to control access to the set of portions of the memory component based on the set of access identifiers. As an example, the processor hardware memory management engine may receive an access request from a user process including an accounting application that requests write access to the first portion of the memory component of the container to update a set of currency values for a marketing budget. Other methods of receiving the access request from the first user process using the processor hardware memory management engine are also possible.

At block 440, a first candidate access identifier may be detected. The first candidate access identifier may be for the first portion of the memory component associated with the container-based virtualization environment. The detecting may be performed by the processor hardware memory management engine with respect to the access request. Generally, detecting can include sensing, discovering, recognizing, resolving, or otherwise identifying the first candidate access identifier for the first portion of the memory component. The first candidate access identifier may include a potential or tentative access identifier that has not yet been verified as authentic or valid for access with respect to the first portion of the memory component. In embodiments, detecting the first candidate access identifier may include parsing the access request to identify a first candidate access identifier that is specified by the first access request. Consider the following example. A data packet indicating the first access request may be received by the processor hardware memory management engine. In response to receiving the data packet, the processor hardware memory management engine may be configured to parse a header of the data packet that designates the first candidate access identifier. For instance, the processor hardware memory management engine may detect a candidate access identifier of "00000000000000000100000000000000: 00000000000000000000000000000000" in the header of the data packet that corresponds to the first portion of the memory component. Other methods of detecting the first candidate access identifier with respect to the access request are also possible.

At block 460, a first access identifier may be identified. The first access identifier may be of the set of access identifiers that corresponds to the first portion of the memory component associated with the container-based virtualization environment. The identifying may be performed by the processor hardware memory management engine. Generally, identifying can include detecting, recognizing, sensing, discovering, resolving, ascertaining, or otherwise determining the first access identifier of the set of access identifiers. The first access identifier may be a particular access identifier that corresponds to the first portion of the memory component. For instance, the first access identifier may be an access identifier that is registered, linked, or coupled with the first portion of the memory component within the page table. In embodiments, identifying may include utilizing the page table to ascertain a page table entry that includes the access identifier that corresponds to the first portion of the memory component. Consider the following example. The processor hardware memory management engine may scan the page table to locate a page table entry that is paired with the first portion of the memory component, and subsequently determine an access identifier of "00000000000100000000000000000000: 00000000000000000000000000000000" specified by the page table entry as the first access identifier. In embodiments, as described herein, the first access identifier may be used to authenticate access to the first portion of the memory component by one or more user processes. Other methods of identifying the first access identifier that corresponds to the first portion of the memory component associated with the container-based virtualization environment are also possible.

In embodiments, access may be managed at block 469. Access from the kernel and first user processes to the memory component associated with the container-based virtualization environment may be managed. The managing may be performed by the processor hardware memory management engine. Generally, managing can include governing, overseeing, handling, controlling, administering, regulating, or otherwise supervising access from the kernel and first user process to the memory component associated with the container-based virtualization environment. Managing may include authenticating access to the memory component based on the first candidate access identifier and the first access identifier. In embodiments, managing may include using the processor hardware memory management engine to determine to grant access to one or more portions of the memory component by a user process or a kernel process based on a match between the first candidate access identifier and the first access identifier. For instance, granting access may include allowing the user process or the kernel process to have read-access (e.g., permission to view the contents of portions of the memory component) or write-access (e.g., permission to edit or modify the contents of portions of the memory component) to one or more portions of the memory component. In embodiments, managing may include using the processor hardware memory management engine to determine to deny access to one or more portions of the memory component by a user process or a kernel process based on a mismatch between the first candidate access identifier and the first access identifier. As an example, user processes or kernel processes that are denied from having access to the memory component may be prevented from having read-access or write-access to one or more portions of the memory component. Other methods of managing access from the kernel and first user processes to the memory component associated with the container-based virtualization environment are also possible.

In embodiments, the first candidate access identifier and the first access identifier may be compared at block 471. The comparing may be performed to determine the hardware-based memory protection response operation which pertains to the first portion of the memory component associated with the container-based virtualization environment. Generally, comparing can include contrasting, analyzing, juxtaposing, correlating, or evaluating the first candidate access identifier with the first access identifier. Comparing may include using the processor hardware memory management engine to compare an access identifier (e.g., storage protection key) in a page table entry with a candidate access identifier indicated by the access request to authenticate access to a portion of the memory component. In embodiments, comparing may include examining the first candidate access identifier with respect to the first access identifier to identify a degree of similarity between the first candidate access identifier and the first access identifier. For instance, in embodiments, comparing may include ascertaining whether the first candidate access identifier matches the first access identifier (e.g., each character of the candidate access identifier is identical to the character in the corresponding position of the first access identifier). As an example, a first candidate access identifier of "00000000000100000000000000000000: 00000000000000000000000000000000" may be compared with the first access identifier of "00000000000100000000000000000000: 00000000000000000000000000000000," and it may be determined that the first candidate access identifier matches the first access identifier (e.g., such that at least partial access to the portion of the memory component corresponding to the first access identifier may be granted to the user process or kernel process that provided the first candidate access identifier). As another example, a first candidate access identifier of "01000000000000000000000000000000: 00000000000000000000000000000010" may be compared with a first access identifier of "00100000000000000000000000000000: 00000000000000000000000000000100," and it may be determined that the first candidate identifier mismatches the first access identifier (e.g., such that access to the portion of the memory component corresponding to the first access identifier may be denied to the user process or kernel process that provided the first candidate access identifier). Other methods of comparing the first candidate access identifier and the first access identifier are also possible.

At block 480, a hardware-based memory protection response operation may be determined. The hardware-based memory protection response operation may pertain to the first portion of the memory component associated with the container-based virtualization environment. The determining may be performed by the processor hardware memory management engine based on the first candidate access identifier and the first access identifier. Generally, determining can include formulating, resolving, computing, calculating, identifying, or otherwise ascertaining the hardware-based memory protection response operation based on the first candidate access identifier and the first access identifier. The hardware-based memory protection response operation may include a process, procedure, or other action configured to manage access to the first portion of the memory component. In embodiments, the hardware-based memory protection response operation may include a procedure to allow (e.g., grant, permit, provide) read-access, write-access, or both read and write access to the first portion of the memory component. In embodiments, the hardware-based memory protection response operation may include a procedure to disallow (e.g., deny, prevent, block) read-access, write-access, or both read and write access to the first portion of the memory component. As described herein, the hardware-based memory protection response operation may be determined based on the first candidate access identifier and the first access identifier. In embodiments, the hardware-based memory protection response operation may be determined based on a relationship between a logical sum of the first candidate access identifier and the first access identifier. For instance, determining may include computing a logical sum for the first candidate access identifier and the first access identifier, and ascertaining a hardware-based memory protection response operation to allow access to the first portion of the memory component when the logical sum is 0, and ascertaining a hardware-based memory protection response operation to disallow access to the first portion of the memory component when the logical sum is 1. Other methods of determining the hardware-based memory protection response operation are also possible.

At block 490, the hardware-based memory protection response operation may be carried-out. The hardware-based memory protection response operation may pertain to the first portion of the memory component associated with the container-based virtualization environment. The carrying-out may be performed by the processor hardware memory management engine. Generally, carrying-out can include implementing, instantiating, executing, enacting, realizing, fulfilling, accomplishing, initiating, or otherwise performing the hardware-based memory response operation. Carrying-out may include allowing or disallowing access to the first portion of the memory component based on the hardware-based memory protection response operation determined using the first candidate access identifier and the first access identifier. In embodiments, carrying-out may include using the processor hardware memory management engine to modify a set of access permissions for the first portion of the memory component. For instance, in certain embodiments, carrying-out may include editing the set of access permissions to mark the user process or kernel process that provided the first candidate access identifier as authenticated for access with respect to the first portion of the memory component (e.g., in response to determining a match between the first candidate access identifier and the first access identifier; in response to determining that a logical sum for the first candidate access identifier is less than 1). As another example, in certain embodiments, carrying-out may include editing the set of access permissions to mark the user process or kernel process that provided the first candidate access identifier as disallowed for access with respect to the first portion of the memory component (e.g., in response to determining a mismatch between the first candidate access identifier and the first access identifier; in response to determining that a logical sum for the first candidate access identifier is 1). As such, the hardware-based memory protection response operation may be performed to provide or restrict access to the first portion of the memory component based on the first candidate access identifier and the first access identifier. Other methods of carrying-out the hardware-based memory protection response operation with respect to the first portion of the memory component are also possible.

In embodiments, a hardware-based memory protection allowance operation may be determined at block 491. The hardware-based memory protection allowance operation may pertain to the first portion of the memory component associated with the container-based virtualization environment. The determining may be performed by the processor hardware memory management engine based on the first candidate access identifier and the first access identifier. Generally, determining can include formulating, resolving, computing, calculating, identifying, or otherwise ascertaining the hardware-based memory protection allowance operation based on the first candidate access identifier and the first access identifier. The hardware-based memory protection allowance operation may include a process, procedure, or action to permit access to the first portion of the memory component by a user process or kernel process. The hardware-based memory protection allowance operation may be configured to provide read-access, write-access, or both read and write access to the first portion of the memory component. In embodiments, as described herein, the hardware-based memory protection allowance operation may be determined based on a logical sum of the first candidate access identifier. For instance, in embodiments, determining the hardware-based memory protection allowance operation may include computing a logical sum for the first candidate access identifier, and ascertaining that the logical sum has a bit value of less than "1" for either the first bit or the second bit. As example, consider a situation in which a first candidate access identifier of "00000000000000000000000010000000: 00000000000000000000000000000000" is specified by the first access request. A logical sum of "1" may be computed for the first bit, and a logical sum of "0" may be computed for the second bit. Accordingly, a hardware-based memory protection allowance operation to allow read-access to the first portion of the memory component may be determined (e.g., as the logical sum for the second bit, which governs read-access control to the first portion of the memory component, is "0"). In embodiments, the hardware-based memory protection allowance operation may be carried-out. The hardware-based memory protection allowance operation may pertain to the first portion of the memory component associated with the container-based virtualization environment. The carrying-out may be performed by the processor hardware memory management engine. Generally, carrying-out can include implementing, instantiating, executing, enacting, realizing, fulfilling, accomplishing, initiating, or performing the hardware-based memory protection allowance operation. In embodiments, carrying-out the hardware-based memory protection allowance operation may include modifying a set of access permissions for the first portion of the memory component to grant access by the user process or kernel process that provided the first candidate access identifier. Accordingly, the user process or kernel process may be allowed to perform read-operations with respect to the first portion of the memory component. Other methods of determining and carrying-out the hardware-based memory protection allowance operation are also possible.

In embodiments, a hardware-based memory protection disallowance operation may be determined at block 492. The hardware-based memory protection disallowance operation may pertain to the first portion of the memory component associated with the container-based virtualization environment. The determining may be performed by the processor hardware memory management engine based on the first candidate access identifier and the first access identifier. Generally, determining can include formulating, resolving, computing, calculating, identifying, or otherwise ascertaining the hardware-based memory protection disallowance operation based on the first candidate access identifier and the first access identifier. The hardware-based memory protection disallowance operation may include a process, procedure, or action to deny or prevent access to the first portion of the memory component by a user process or kernel process. The hardware-based memory protection disallowance operation may be configured to prevent read-access, write-access, or both read and write access to the first portion of the memory component. In embodiments, as described herein, the hardware-based memory protection disallowance operation may be determined based on a logical sum of the first candidate access identifier. For instance, in embodiments, determining the hardware-based memory protection disallowance operation may include computing a logical sum for the first candidate access identifier, and ascertaining that the logical sum has a bit value of greater than "0" for either the first bit, the second bit, or both. As example, consider a situation in which a first candidate access identifier of "00000000000000000000000010000000: 00000000000000000000000001000000" is specified by the first access request. A logical sum of "1" may be computed for the first bit, and a logical sum of "1" may be computed for the second bit. Accordingly, a hardware-based memory protection disallowance operation to prevent both read-access and write-access to the first portion of the memory component may be determined (e.g., as the logical sum for the first bit, which governs write-access control to the first portion of the memory component, as well as the logical sum for the second bit, which governs read-access control to the first portion of the memory component, are both "1"). The hardware-based memory protection disallowance operation which pertains to the first portion of the memory component associated with the container-based virtualization environment may be carried-out. The carrying-out may be performed by the processor hardware memory management engine. Generally, carrying-out can include implementing, instantiating, executing, enacting, realizing, fulfilling, accomplishing, initiating, or performing the hardware-based memory protection disallowance operation. In embodiments, carrying-out the hardware-based memory protection disallowance operation may include modifying a set of access permissions for the first portion of the memory component to prevent access by the user process or kernel process that provided the first candidate access identifier. Accordingly, the user process or kernel process may be prevented from performing read-operations or write-operations with respect to the first portion of the memory component. Other methods of determining and carrying-out the hardware-based memory protection disallowance operation are also possible.

In embodiments, the hardware-based memory protection of the container-based virtualization environment may be performed without a multithreading lock mechanism at block 495. Generally, performing can include implementing, instantiating, executing, enacting, realizing, fulfilling, accomplishing, initiating, or otherwise carrying-out the hardware-based memory protection without the multi-threading lock mechanism. The multi-threading lock mechanism may include a synchronization technique for enforcing limits on access to a resource (e.g., first portion of a memory component) in the container-based virtualization environment (e.g., to prevent multiple execution threads from accessing the first portion of the memory component at the same time). Aspects of the disclosure relate to the recognition that, in some situations, the multi-threading lock mechanism may be associated with congestion, stalls, or system slowdown as multiple execution threads (e.g., of user processes or kernel processes) wait for their turn to access the first portion of the memory component. Accordingly, aspects of the disclosure relate to managing access to the first portion of the memory component using a hardware implementation such that software-based synchronization techniques may be avoided (e.g., positively impacting memory access overhead). In embodiments, performing hardware-based memory protection may include disabling the multi-threading lock mechanism, and managing access to the first portion of the memory component using storage protection keys maintained in hardware registers, such that user processes and kernel processes may be authenticated using the first candidate access identifier and the access identifier (e.g., rather than waiting their turn using a multi-threading lock mechanism). Other methods of performing hardware-based memory protection of the container-based virtualization environment without a multithreading lock mechanism are also possible.

Consider the following example. A set of access identifiers may be established for a set of portions of a memory component. In embodiments, establishing the set of access identifiers may include receiving one or more user-defined access identifiers for one or more portions of a memory component (e.g., through an application programming interface provided by the operating system), and storing the received access identifiers in page table entries of a page table maintained by a group of hardware registers. As an example, an access identifier of "0000000000000000001000000000000: 0000000000000000000000000000000000" may be established for a first portion of a memory component. In embodiments, an access request may be received from a first user process with respect to the first portion of the memory component, and a first candidate access identifier may be detected for the access request. As an example, a candidate access identifier of "0000000000000000001000000000000: 0000000000000000000000000000000000" may be detected with respect to the access request. In embodiments, a first access identifier for the first portion of the memory component may be identified (e.g., from a page table entry for the first portion). Based on the first access identifier and the first candidate access identifier, a hardware-based memory protection response operation may be determined. As an example, in certain embodiments, determining may include comparing the first access identifier of "0000000000000000001000000000000: 0000000000000000000000000000000000" with respect to the first candidate access identifier of "0000000000000000001000000000000: 0000000000000000000000000000000000," and ascertaining a match between the first access identifier and the first candidate access identifier. In response to ascertaining the match, a hardware-based memory protection allowance operation to provide access to the first portion of the memory component by the first user process may be determined and carried out. Other methods of managing access to the memory component (e.g., using logical sums as described herein) are also possible.

Method 400 concludes at block 499. Aspects of method 400 may provide performance or efficiency benefits for hardware-based memory protection management. As an example, managing access to portions of a memory component of a container using hardware-based memory protection techniques may be associated with reduced memory access overhead, software simplicity, and avoid the need for multithreading lock mechanisms. Altogether, leveraging usage of storage protection keys with respect to container-based virtualization environment may be associated with benefits including data security, memory accessibility, and operational performance. Aspects may save resources such as bandwidth, disk, processing, or memory.

Figure 5:
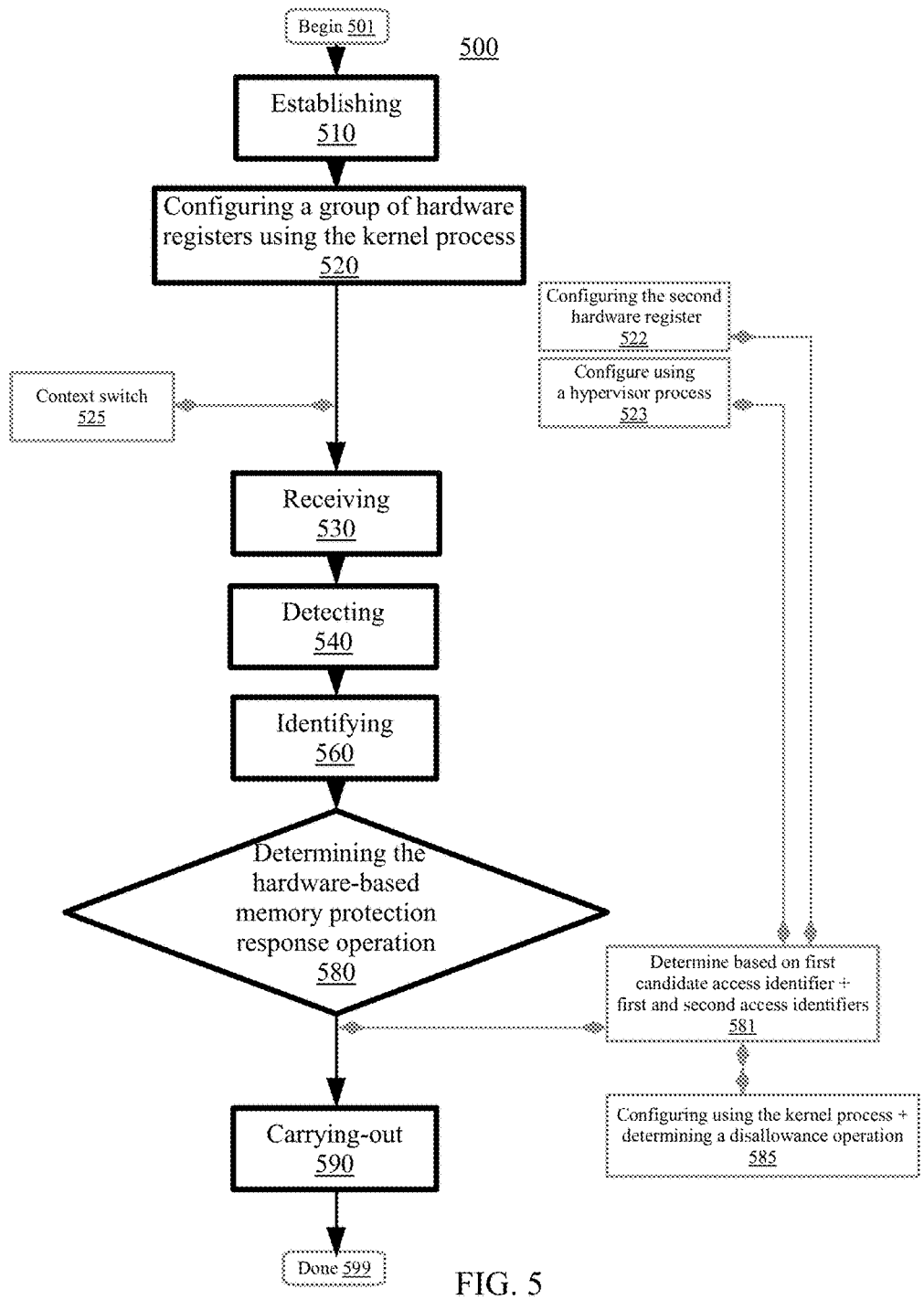
FIG. 5 is a flowchart illustrating a method for hardware-based memory protection of a container-based virtualization environment, according to embodiments.

FIG. 5 is a flowchart illustrating a method 500 for hardware-based memory protection of a container-based virtualization environment, according to embodiments. Aspects of method 500 relate to using a group of hardware registers to manage access to one or more portions of a memory component of a container-based virtualization environment. More particularly, aspects relate to determining a hardware-based memory protection response operation based on a first candidate access identifier and a first access identifier of a first hardware register of a group of hardware registers. Aspects of method 500 may be similar or the same as aspects of method 400, and aspects may be utilized interchangeably. The method 500 may begin at block 501.

At block 510, a set of access identifiers for a container of a kernel process may be established. The kernel process may relate to a memory component associated with the container-based virtualization environment. The establishing may be performed as part of hardware-based memory protection of the container-based virtualization environment.

At block 520, a group of hardware registers which have the set of access identifiers may be configured. The configuring may be performed using the kernel process to manage access authority of the first user process to the memory component associated with the container-based virtualization environment. Generally, configuring can include formulating, arranging, programming, setting-up, instructing, organizing, or otherwise structuring the group of hardware registers which have the set of access identifiers. The group of hardware registers may include a collection of one or more circuits (e.g., flip flop circuits) configured to support the reading and writing of bits. Software programs may write bits to the hardware registers to send information to other devices, and read bits from the hardware registers to retrieve information from other devices. In embodiments, the group of hardware registers may be configured to read or write multiple bits at a time, and use an address to select a particular register in a manner similar to memory addresses. In embodiments, configuring the group of hardware registers may include using a kernel process to write the set of access identifiers to the group of hardware registers in the form of bit values that represent access authority (e.g., permission to access) with respect to one or more portions of the memory component. As an example, a kernel process including a data security operation may write an access identifier of "00000000010000000000000000000000: 00000000000001000000000000000000" to a hardware register of the group of hardware registers. Other methods of configuring the group of hardware registers that have the set of access identifiers are also possible.

In embodiments, the second hardware register which has the second access identifier may be configured at block 522. The configuring may be performed using a second user process to manage access authority of the first user process to the memory component associated with the container-based virtualization environment. Generally, configuring can include formulating, arranging, programming, setting-up, instructing, organizing, or otherwise structuring the second hardware register which has the second access identifier. The second hardware register may include a particular hardware register of the group of hardware registers configured to maintain the second access identifier. In embodiments, the second hardware register may include a user authority mask override register (UAMOR) that is configured to be changeable by a user process, kernel process, or hypervisor process to manage which processes are allowed to access one or more portions of the memory component (e.g., restrict memory access by a user processor other than a specified user process). In embodiments, configuring the second hardware register may include using an application programming interface (API) to prompt a user to define the second access identifier for the second hardware register. As an example, a graphical user interface (GUI) may be presented to a user via an operating system, and a user input specifying a second access identifier of "10000000000000000000000000000000: 00000000000000000000000010000000" may be received by the GUI. Accordingly, the second access identifier of "10000000000000000000000000000000: 00000000000000000000000010000000" may be written to the second hardware register for use in managing access to one or more portions of the memory component of the container-based virtualization environment. In certain embodiments, the second access identifier may be used to manage access authority of the first user process to the memory component. For instance, as described herein, a second access identifier with a logical sum of "1" (e.g., for either the first or the second bit) may prevent either read or write access by the first user process to the memory component. As such, the first user process may use the second access identifier to allow or restrict access to the memory component by other user processes. Other methods of configuring the second hardware register which has the second access identifier using the second user process are also possible.

In embodiments, the second hardware register which has the second access identifier may be configured at block 523. The configuring may be performed using a hypervisor process to manage access authority of one or more processes to the memory component associated with the container-based virtualization environment. Generally, configuring can include formulating, arranging, programming, setting-up, instructing, organizing, or otherwise structuring the second hardware register which has the second access identifier using a hypervisor process. As described herein, in certain embodiments the second hardware register may include a user authority mask override register (UAMOR) that is configured to be changeable by a user process, kernel process, or hypervisor process to manage which processes are allowed to access one or more memory portions (e.g., restrict memory access by a user processor other than a specified user process). In certain embodiments, the second hardware register may include an authority mask register (AMR). The hypervisor process may include one or more tasks, commands, directives, instructions, or other instances of a computer program that are performed by the hypervisor. In embodiments, configuring the second hardware register may include using a hypervisor processor to define the second access identifier to manage access to the memory component by other processes. As an example, in certain embodiments, the hypervisor may write a second access identifier of "00100000000000000000000000000000: 00000000000000000000000000000000" to the second register to restrict write access to a particular portion of the memory component by one or more user processes or kernel processes (e.g., as the logical sum for the first bit, which governs write access, is "1"). Other methods of using a hypervisor process to manage access to one or more portions of the memory component are also possible.

In embodiments, a context switch with respect to the container may be detected at block 525. The detecting may be performed by the processor hardware memory management engine. Generally, detecting can include sensing, discovering, recognizing, resolving, or otherwise identifying the context switch with respect to the container. The context switch may include the process of storing and restoring a state (e.g., execution context) of a process or thread so that execution can be resumed from the same point at a later time. For instance, one or more user processes, kernel processes, or hypervisor processors performed with respect to the container may be temporarily suspended in situations when the container is replaced with a new container, and subsequently resumed on the new container. In embodiments, detecting the context switch may include using a task manager application of the operating system kernel to monitor the user processes, kernel processes, and hypervisor processes scheduled for execution with respect to a first container, and identifying that one or more of the scheduled processes is transferred to a second container. In embodiments, the first hardware register of the group of hardware registers may be switched. The switching may be performed by the processor hardware memory management engine in response to detecting the context switch with respect to the container. Generally, switching can include replacing, substituting, swapping, changing, shifting, altering, or otherwise exchanging the first hardware register of the group of hardware registers. In embodiments, exchanging may include replacing the first hardware register with a new hardware register using a hardware register group ID. For instance, in response to detecting a context switch with respect to a container of the container-based virtualization environment, a hardware register group ID may be changed from a first hardware register group ID for the first hardware register to a second hardware register group ID for the new hardware register, such that the new hardware register assumes the functionality of the first hardware register with respect to the new container. As such, when processes are switched between containers by a context switch, the registers may be automatically switched by changing the group ID from the first hardware register group ID to the second hardware register group ID (e.g., avoiding the need to reconfigure the hardware registers each time containers are switched). Other methods of detecting a context switch and switching the first hardware register of the group of hardware registers are also possible.

At block 530, an access request may be received. The access request may be received from a first user process to a first portion of the memory component associated with the container-based virtualization environment. The receiving may be performed by a processor hardware memory management engine. At block 540, a first candidate access identifier may be detected. The first candidate access identifier may be for the first portion of the memory component associated with the container-based virtualization environment. The detecting may be performed by the processor hardware memory management engine with respect to the access request. At block 560, a first access identifier may be identified. The first access identifier may be of the set of access identifiers that corresponds to the first portion of the memory component associated with the container-based virtualization environment. The identifying may be performed by the processor hardware memory management engine.

At block 580, the hardware-based memory protection response operation which pertains to the first portion of the memory component associated with the container-based virtualization environment may be determined. The determining may be performed by the processor hardware memory management engine based on the first candidate access identifier and the first access identifier of a first hardware register of the group of hardware registers. Generally, determining can include formulating, resolving, computing, calculating, identifying, or otherwise ascertaining the hardware-based memory protection response operation based on the first candidate access identifier and the first access identifier of the first hardware register of the group of hardware registers. As described herein, the hardware-based memory protection response operation may include a process, procedure, or other action configured to manage access to the first portion of the memory component. In embodiments, the hardware-based memory protection response operation may include a procedure to allow (e.g., grant, permit, provide) read-access, write-access, or both read and write access to the first portion of the memory component. In embodiments, the hardware-based memory protection response operation may include a procedure to disallow (e.g., deny, prevent, block) read-access, write-access, or both read and write access to the first portion of the memory component. As described herein, the hardware-based memory protection response operation may be determined based on the first candidate access identifier and the first access identifier of the first hardware register. For instance, in embodiments, determining the hardware-based memory protection response action may include comparing a first candidate access identifier indicated by a first access request with the first access identifier maintained by the first hardware register. As an example, in response to receiving a first candidate access identifier from a first access request, the processor hardware memory management engine may read the bit corresponding to the first access identifier from the page table entry of the first hardware register, and compare the first access identifier to the first candidate access identifier. In the event that the first candidate access identifier matches the access identifier stored in the first hardware register, access to the first portion of the memory component may be allowed to the process that submitted the first access request. In the event that the first candidate access identifier does not match (e.g., mismatches, differs from) the access identifier stored in the first hardware register, access to the first portion of the memory component may be disallowed. Other methods of determining the hardware-based memory protection response operation which pertains to the first portion of the memory component associated with the container-based virtualization environment are also possible.

In embodiments, the hardware-based memory protection response operation which pertains to the first portion of the memory component associated with the container-based virtualization environment may be determined at block 581. The determining may be performed by the processor hardware memory management engine. The determining may be performed based on the first candidate access identifier, the first access identifier of the first hardware register of the group of hardware registers, and a second access identifier of a second hardware register of the group of hardware registers. Generally, determining can include formulating, resolving, computing, calculating, identifying, or otherwise ascertaining the hardware-based memory protection response operation based on the first candidate access identifier, the first access identifier of the first hardware register of the group of hardware registers, and a second access identifier of a second hardware register of the group of hardware registers. In certain embodiments, aspects of the disclosure relate to managing memory access to the memory component based on a logical sum of an authority mask register (AMR), an authority mask override register (AMOR), and a user authority mask override register (UAMOR). As described herein, the first candidate access identifier may include the access identifier included in the first access request (e.g., specified by a user process), and the first access identifier may include the access identifier established for the first portion of the memory component in the page table entry of the first register. The second access identifier may include an access identifier defined by a kernel process or a hypervisor provider, and written as a bit to the second hardware register of the set of hardware registers. In embodiments, determining the hardware-based memory protection response operation may include computing a logical sum of one or more of the first access identifier, the first candidate access identifier, and the second access identifier, and allowing access to the first portion of the memory component when the logical sum is 0, and disallowing access to the first portion of the memory component when the logical sum is 1. As an example, consider that the first hardware register indicates a first access identifier of "0000000000000000000000001000000: 0000000000000000000000000000000000," a second hardware register indicates a second access identifier of "00000010000000000000000000000000: 00000000000000000000000000000000," and an access request indicates a first candidate access identifier of "00000000000000000000000000000000: 00000000000000000000000000000000." Accordingly, a logical sum may be computed for one or more of the first candidate access identifier, the first access identifier, and the second access identifier, and it may be determined that the logical sum for the first bits computes to a value greater than 0, while the logical sum for the second bits computes to a value of 0. Accordingly, a hardware-based memory protection response operation may be determined to provide read access to the first portion of the memory component (e.g., as the logical sum of the second bits was 0), and prevent write access to the first portion of the memory component (e.g., as the logical sum of the first bits was greater than 0). Other methods of determining the hardware-based memory protection response operation based on the first candidate access identifier, the first access identifier, and the second candidate access identifier are also possible.

In embodiments, the second hardware register which has the second access identifier may be configured at block 585. The configuring may be performed using the kernel process to manage access authority of one or more user processes to the memory component associated with the container-based virtualization environment. Generally, configuring can include formulating, arranging, programming, setting-up, instructing, organizing, or otherwise structuring the second register using the kernel process to manage access authority of one or more user processes. As described herein, the kernel process may include a set of tasks, commands, directives, instructions, or other instances of a computer program that are performed by the kernel (e.g. in kernel space). In embodiments, aspects of the disclosure relate to using the kernel to configure the second hardware register (e.g., authority mask override register) to manage which user processes are allowed to access the first portion of the memory component. For instance, configuring may include using the kernel process to define the second access identifier by writing a bit value to the second hardware register. As an example, the kernel process may define a second access identifier that has a logical sum of "0" for both the first and second bits (e.g., 00000000000000000000000000000000: 00000000000000000000000000000000) to allow both read and write access by user processes to the first portion of the memory component, or a second access identifier that has a logical sum of "1" for either one or both of the first or second bits (e.g., 00100000000000000000000000000000: 00000000000000000000000000000000, 00000000000000000000000000000000: 00000000000000010000000000000000, or 00000000000000000000000000100000: 00010000000000000000000000000000) to prevent read access, write access, or both read and write access by user processes to the first portion of the memory component.

In embodiments, a hardware-based memory protection disallowance operation which pertains to the first portion of the memory component associated with the container-based virtualization environment may be determined. The determining may be performed by the processor hardware memory management engine based on the second access identifier of the second hardware register of the group of hardware registers. Generally, determining can include formulating, resolving, computing, calculating, identifying, or otherwise ascertaining the hardware-based memory protection disallowance operation based on the first candidate access identifier and the first access identifier. As described herein, the hardware-based memory protection disallowance operation may include a process, procedure, or action to deny or prevent access to the first portion of the memory component by a user process or kernel process. The hardware-based memory protection disallowance operation may be configured to prevent read-access, write-access, or both read and write access to the first portion of the memory component. In embodiments, as described herein, the hardware-based memory protection disallowance operation may be determined based on a logical sum of the second access identifier. For instance, determining the hardware-based memory protection disallowance operation may include computing a logical sum for the second candidate access identifier, and ascertaining that the logical sum has a bit value of greater than "0" for either the first bit, the second bit, or both. As an example, consider a situation in which a second access identifier of "00000100000000000000000000000000: 00000000000000000000000000000001" is defined by the kernel process. A logical sum of "1" may be computed for the first bit, and a logical sum of "1" may be computed for the second bit. Accordingly, a hardware-based memory protection disallowance operation to prevent both read-access and write-access to the first portion of the memory component may be determined (e.g., as the logical sum for the first bit, which governs write-access control to the first portion of the memory component, as well as the logical sum for the second bit, which governs read-access control to the first portion of the memory component, are both "1"). The hardware-based memory protection disallowance operation which pertains to the first portion of the memory component associated with the container-based virtualization environment may be carried-out. The carrying-out may be performed by the processor hardware memory management engine. Generally, carrying-out can include implementing, instantiating, executing, enacting, realizing, fulfilling, accomplishing, initiating, or performing the hardware-based memory protection disallowance operation. In embodiments, carrying-out the hardware-based memory protection disallowance operation may include modifying a set of access permissions for the first portion of the memory component to prevent access by the user process or kernel process that provided the first candidate access identifier. Accordingly, the user process or kernel process may be prevented from performing read-operations or write-operations with respect to the first portion of the memory component. Other methods of determining and carrying-out the hardware-based memory protection disallowance operation are also possible.

At block 590, the hardware-based memory protection response operation may be carried-out. The hardware-based memory protection response operation may pertain to the first portion of the memory component associated with the container-based virtualization environment. The carrying-out may be performed by the processor hardware memory management engine.

Method 500 concludes at block 599. Aspects of method 500 may provide performance or efficiency benefits for hardware-based memory protection management. Altogether, leveraging usage of storage protection keys with respect to container-based virtualization environment may be associated with benefits including data security, memory accessibility, and operational performance. Aspects may save resources such as bandwidth, disk, processing, or memory.

Figure 6:
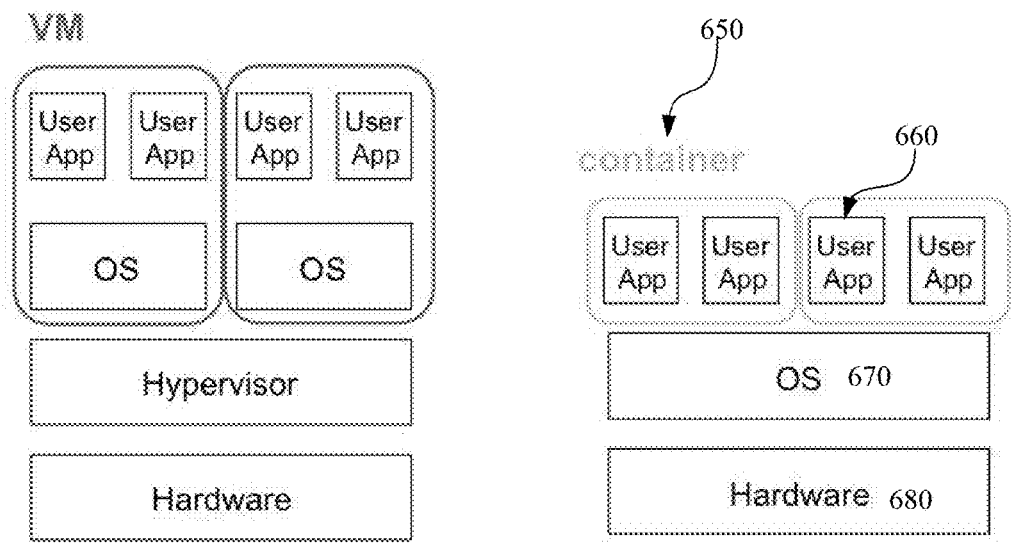
FIG. 6 illustrates an example system architecture for hardware-based memory protection of a container-based virtualization environment, according to embodiments.

FIG. 6 illustrates an example system architecture 600 for hardware-based memory protection of a container-based virtualization environment, according to embodiments. As shown in FIG. 6, the system architecture 600 may include a container 650 that may be used to support operation of one or more user applications 660. The container 650 may utilize a shared operating system environment 670 for each user application 660 (e.g., rather than using a separate operating system instance for each user application) and run on a single host hardware unit 680. As described herein, the container 650 may have one or more memory components allocated by the kernel for use by the container 650. The memory components may include one or more portions. The one or more portions may include segments, pieces, parts, sections, or partitions of the memory component that are used for particular functions within the container 650. For instance, each portion may be designated for use by a particular user application 660 hosted by the container 650. As described herein, aspects of the disclosure relate to hardware-based memory protection for one or more portions of the memory component of a container 650 using a set of access identifiers (e.g., storage protection keys). Other types of system architecture for hardware-based memory protection of a container-based virtualization environment are also possible.

Figure 7:
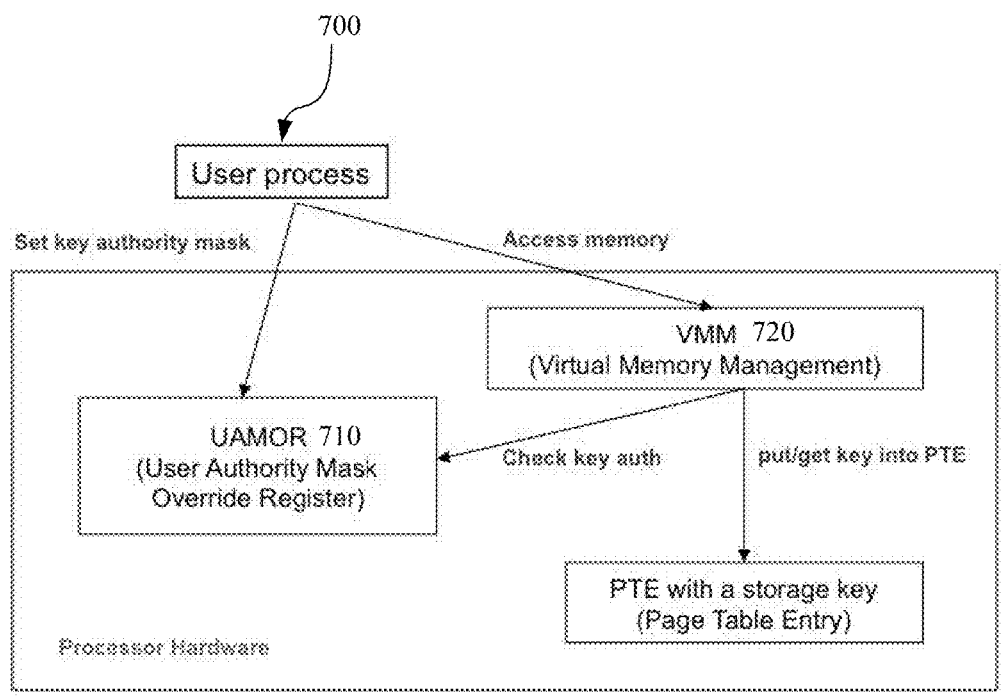
FIG. 7 illustrates an example user process for hardware-based memory protection of a container-based virtualization environment, according to embodiments.

FIG. 7 illustrates an example user process 700 for hardware-based memory protection of a container-based virtualization environment, according to embodiments. The user process 700 may set an access identifier (e.g., storage protection key) to a memory page table through an API provided by a system OS, and assign the access identifier to a dedicated hardware register such as the user authority mask override register (UAMOR) 710. A virtual memory management module 720 may be configured to read the access identifier from the UAMOR 710 to authenticate the validity of the key and perform memory access, enabling memory access protection through the access identifier by the memory virtualization mechanism of the processor. As such, managing access to portions of a memory component of a container using hardware-based memory protection techniques may be associated with reduced memory access overhead, software simplicity, and avoid the need for multithreading lock mechanisms. Other methods of using a user process 700 for hardware-based memory protection of a container-based virtualization environment are also possible.

Figure 8:
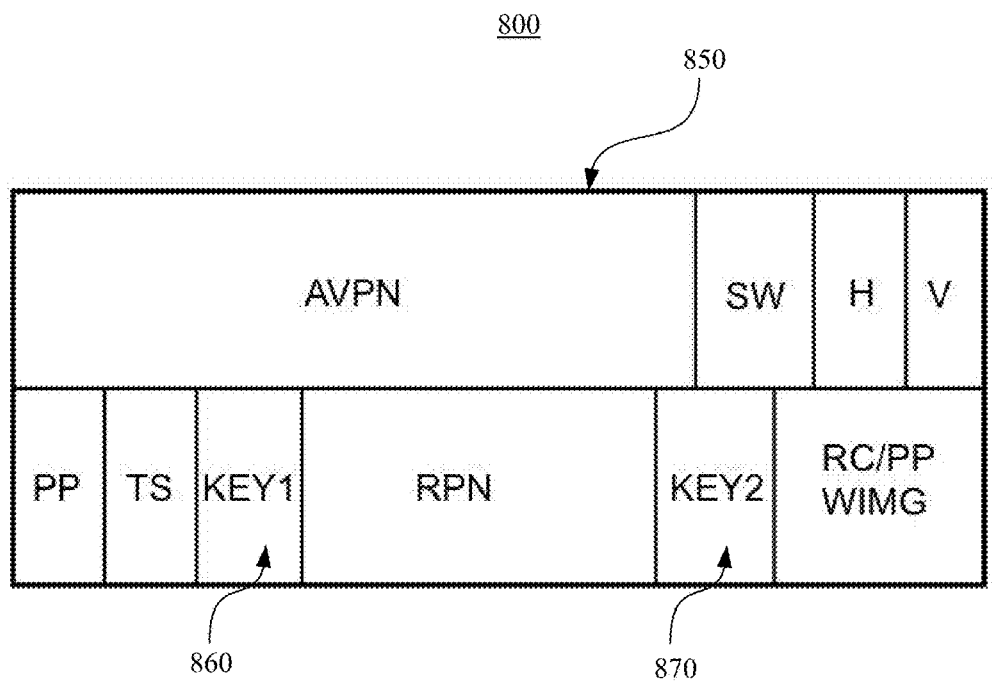
FIG. 8 illustrates an example hardware implementation of hardware-based memory protection of a container-based virtualization environment, according to embodiments.

FIG. 8 illustrates an example hardware implementation 800 of hardware-based memory protection of a container-based virtualization environment, according to embodiments. Aspects of the example hardware implementation 800 relate to using a page table entry 850 to maintain one or more access identifiers to manage access to one or more portions of a memory component of a container-based virtualization environment. In embodiments, the page table entry 850 may be managed by a host operating system. The page table entry may include a first key entry 860 (KEY 1) and a second key entry 870 (KEY 2). As described herein, the first key entry 860 and the second key entry 870 may be used to maintain access identifiers corresponding to particular portions of the memory component of a container in the container-based virtualization environment. In embodiments, the first key entry 860 may be configured to provide 2 bits of storage, and the second key entry 870 may be configured to provide 3 bits of storage, which allows 5 bits of access identifier storage to be provided for each memory entry. Other methods of using a page table entry 850 for hardware-based memory protection of a container-based virtualization environment are also possible.

Figure 9:
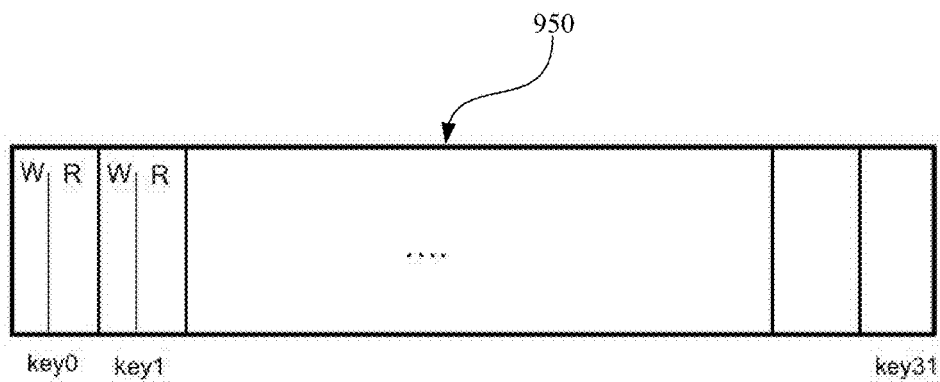
FIG. 9 illustrates an example hardware implementation of hardware-based memory protection of a container-based virtualization environment, according to embodiments.

FIG. 9 illustrates an example hardware implementation 900 of hardware-based memory protection of a container-based virtualization environment, according to embodiments. As illustrated in FIG. 9, access identifiers may be managed by an authority mask register (AMR) 950. The AMR 950 may include a bit that defines read and write access for each access identifier. For example, bits with a logical sum of "0" may be allowed access to one or more portions of the memory component, while bits with a logical sum of "1" may not be allowed to access portions of the memory component. A processor hardware memory management engine may be configured to compare an access identifier in the page table entry with an access bit corresponding to the access identifier in the AMR 950 to determine whether memory access to the memory component should be allowed for a user process, kernel process, or hypervisor process. Other methods of using an authority mask register for hardware-based memory protection of a container-based virtualization environment are also possible.

Figure 10:
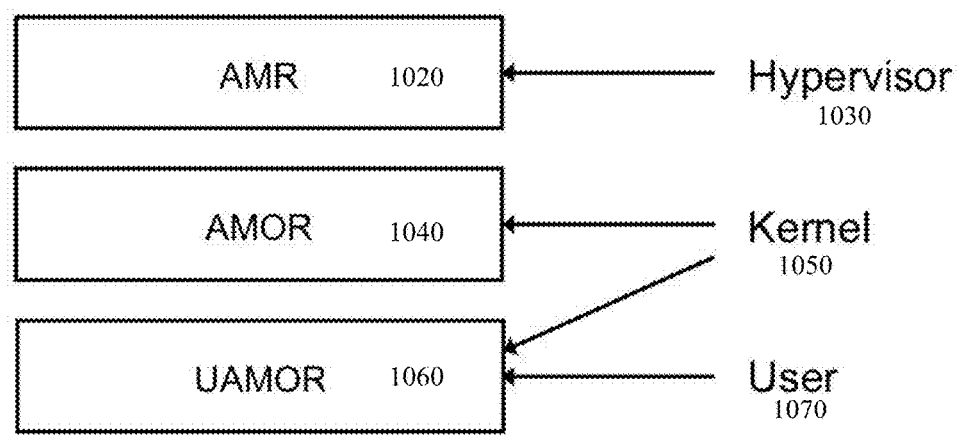
FIG. 10 illustrates an example hardware implementation of hardware-based memory protection of a container-based virtualization environment, according to embodiments.

FIG. 10 illustrates an example hardware implementation 1000 of hardware-based memory protection of a container-based virtualization environment, according to embodiments. Aspects of FIG. 10 relate to managing access to one or more portions of a memory component of a container in a container-based virtualization environment based on a logical sum of bits maintained in a group of hardware registers. In embodiments, the authority mask register (AMR) 1020 may be structured such that a settable register differs depending on the authority level of the process that is using it. For instance, as shown in FIG. 10, the AMR 1020 may be configured to be directly set by the hypervisor 1030, an OS kernel 1050 may directly access an authority mask override register (AMOR) 1040, and a user process 1070 may directly access a user authority mask override register (UAMOR) 1060. As described herein, the processor hardware memory management engine may confirm memory access based on the logical sum of the AMR 1020, the AMOR 1040, and the UAMOR 1060. Other methods of managing access to one or more portions of a memory component of a container in a container-based virtualization environment using a group of hardware registers are also possible.

Figure 11:
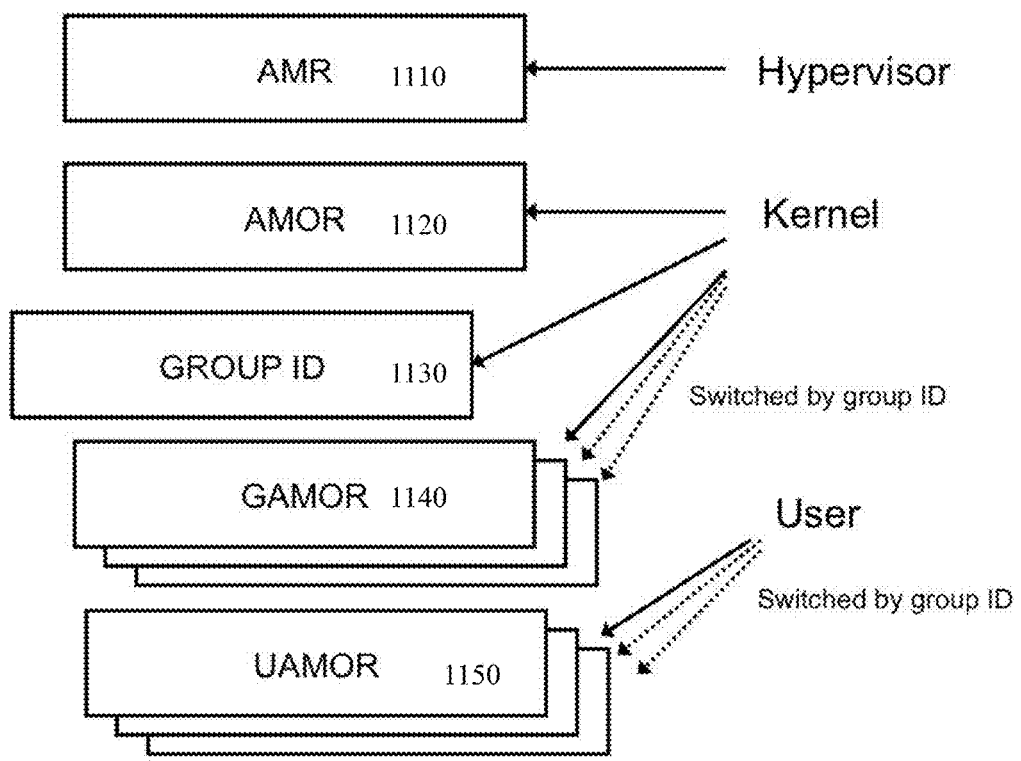
FIG. 11 illustrates an example hardware implementation of hardware-based memory protection of a container-based virtualization environment, according to embodiments.

FIG. 11 illustrates an example hardware implementation 1100 of hardware-based memory protection of a container-based virtualization environment, according to embodiments. Hardware registers may include a group ID register (GIR) 1130 for setting a container ID and a group authority mask override register (GAMOR) 1140 for setting the AMR 1110 for each container. In embodiments, aspects of the hardware implementation 1100 relate to a technique for switching registers groups using the GIR 1130 to specify a particular desired register group. When processes within the processor are switched between containers by a context switch, the GAMOR 1140 and the UAMOR 1150 may be automatically switched by setting the GIR 1130 to a particular group ID register corresponding to a desired register group. In embodiments, aspects of the hardware implementation 1100 relate to determining access to the memory component based on the logical sum of the AMR 1110, the AMOR 1120, the GAMOR 1140, and the UAMOR 1150 for a particular GIR 1130 (e.g., rather than the logical sum of the AMR 1110, the AMOR 1120, and the UAMOR 1150). Other methods of hardware-based memory protection of a container-based virtualization environment are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for hardware-based memory protection of a container-based virtualization environment, the method comprising:

establishing, for hardware-based memory protection of the container-based virtualization environment, a set of access identifiers for a container of a kernel process related to a memory component associated with the container-based virtualization environment;

receiving, by a processor hardware memory management engine, an access request from a first user process to a first portion of the memory component associated with the container-based virtualization environment;

detecting, by the processor hardware memory management engine with respect to the access request, a first candidate access identifier for the first portion of the memory component associated with the container-based virtualization environment;

identifying, by the processor hardware memory management engine, a first access identifier of the set of access identifiers that corresponds to the first portion of the memory component associated with the container-based virtualization environment;
determining, by the processor hardware memory management engine based on the first candidate access identifier and the first access identifier, a hardware-based memory protection response operation which pertains to the first portion of the memory component associated with the container-based virtualization environment;
carrying-out, by the processor hardware memory management engine, the hardware-based memory protection response operation which pertains to the first portion of the memory component associated with the container-based virtualization environment:
configuring, using the kernel process to manage access authority of the first user process to the memory component associated with the container-based virtualization environment, a group of hardware registers which have the set of access identifiers;
determining, by the processor hardware memory management engine based on the first candidate access identifier and the first access identifier of a first hardware register of the group of hardware registers, the hardware-based memory protection response operation which pertains to the first portion of the memory component associated with the container-based virtualization environment;
determining the hardware-based memory protection response operation which pertains to the first portion of the memory component associated with the container-based virtualization environment by the processor hardware memory management engine based on:
the first candidate access identifier,
the first access identifier of the first hardware register of the group of hardware registers, and
a second access identifier of a second hardware register of the group of hardware registers; and
configuring, using a hypervisor process to manage access authority of one or more processes to the memory component associated with the container-based virtualization environment, the second hardware register which has the second access identifier.

2. The method of claim 1, further comprising:
comparing, to determine the hardware-based memory protection response operation which pertains to the first portion of the memory component associated with the container-based virtualization environment, the first candidate access identifier and the first access identifier.

3. The method of claim 1, further comprising:
determining, by the processor hardware memory management engine based on the first candidate access identifier and the first access identifier, a hardware-based memory protection allowance operation which pertains to the first portion of the memory component associated with the container-based virtualization environment; and
carrying-out, by the processor hardware memory management engine, the hardware-based memory protection allowance operation which pertains to the first portion of the memory component associated with the container-based virtualization environment.

4. The method of claim 1, further comprising:
determining, by the processor hardware memory management engine based on the first candidate access identifier and the first access identifier, a hardware-based memory protection disallowance operation which pertains to the first portion of the memory component associated with the container-based virtualization environment; and
carrying-out, by the processor hardware memory management engine, the hardware-based memory protection disallowance operation which pertains to the first portion of the memory component associated with the container-based virtualization environment.

5. The method of claim 1, further comprising:
managing, by the processor hardware memory management engine, access from the kernel and first user processes to the memory component associated with the container-based virtualization environment.

6. The method of claim 1, further comprising:
assigning, using a page table entry, individual access identifiers of the set of access identifiers to individual portions of the memory component associated with the container-based virtualization environment; and
identifying, by the processor hardware memory management engine using the page table entry, the first access identifier of the set of access identifiers that corresponds to the first portion of the memory component associated with the container-based virtualization environment.

7. The method of claim 1, further comprising:
detecting, by the processor hardware memory management engine, a context switch with respect to the container; and
switching, by the processor hardware memory management engine in response to detecting the context switch with respect to the container, the first hardware register of the group of hardware registers.

8. The method of claim 1, further comprising:
configuring, using a second user process to manage access authority of the first user process to the memory component associated with the container-based virtualization environment, the second hardware register which has the second access identifier.

9. The method of claim 1, further comprising:
configuring, using the kernel process to manage access authority of one or more user processes to the memory component associated with the container-based virtualization environment, the second hardware register which has the second access identifier;
determining, by the processor hardware memory management engine based on the second access identifier of the second hardware register of the group of hardware registers, a hardware-based memory protection disallowance operation which pertains to the first portion of the memory component associated with the container-based virtualization environment; and
carrying-out, by the processor hardware memory management engine, the hardware-based memory protection disallowance operation which pertains to the first portion of the memory component associated with the container-based virtualization environment.

10. The method of claim 1, further comprising:
performing, without a multithreading lock mechanism, the hardware-based memory protection of the container-based virtualization environment.

11. The method of claim 1, further comprising:
managing, using the processor hardware memory management engine for hardware-based memory protection of the container-based virtualization environment, a plurality of containers of the kernel process related to the memory component associated with the container-based virtualization environment.

12. The method of claim 1, further comprising:
introducing hardware-based memory protection of the container-based virtualization environment at a hardware-level using one or more labels to indicate one or more relationships with one or more portions of the memory component.

13. The method of claim 1, further comprising:
executing, in a dynamic fashion to streamline hardware-based memory protection of the container-based virtualization environment, each operational step.

14. The method of claim 1, further comprising:
executing, in an automated fashion without user intervention, each operational step.

15. The method of claim 1, further comprising:
managing, by the processor hardware memory management engine, access from the kernel and first user processes to the memory component associated with the container-based virtualization environment;
configuring, using the kernel process to manage access authority of the first user process to the memory component associated with the container-based virtualization environment, a group of hardware registers which have the set of access identifiers;
determining, by the processor hardware memory management engine based on the first candidate access identifier and the first access identifier of a first hardware register of the group of hardware registers, the hardware-based memory protection response operation which pertains to the first portion of the memory component associated with the container-based virtualization environment;
assigning, using a page table entry, individual access identifiers of the set of access identifiers to individual portions of the memory component associated with the container-based virtualization environment;
identifying, by the processor hardware memory management engine using the page table entry, the first access identifier of the set of access identifiers that corresponds to the first portion of the memory component associated with the container-based virtualization environment;
detecting, by the processor hardware memory management engine, a context switch with respect to the container;
switching, by the processor hardware memory management engine in response to detecting the context switch with respect to the container, one or more hardware registers of the group of hardware registers;
determining the hardware-based memory protection response operation which pertains to the first portion of the memory component associated with the container-based virtualization environment by the processor hardware memory management engine based on:
the first candidate access identifier,
the first access identifier of the first hardware register of the group of hardware registers,
a second access identifier of a second hardware register of the group of hardware registers, and
a third access identifier of a third hardware register of the group of hardware registers;
configuring, using a second user process to manage access authority of the first user process to the memory component associated with the container-based virtualization environment, the second hardware register which has the second access identifier; and
configuring, using the kernel process to manage access authority of one or more user processes to the memory component associated with the container-based virtualization environment, the third hardware register which has the third access identifier.

16. A system for hardware-based memory protection of a container-based virtualization environment, the system comprising:
a memory having a set of computer readable computer instructions, and
a processor for executing the set of computer readable instructions, the set of computer readable instructions including:
establishing, for hardware-based memory protection of the container-based virtualization environment, a set of access identifiers for a container of a kernel process related to a memory component associated with the container-based virtualization environment;
receiving, by a processor hardware memory management engine, an access request from a first user process to a first portion of the memory component associated with the container-based virtualization environment;
detecting, by the processor hardware memory management engine with respect to the access request, a first candidate access identifier for the first portion of the memory component associated with the container-based virtualization environment;
identifying, by the processor hardware memory management engine, a first access identifier of the set of access identifiers that corresponds to the first portion of the memory component associated with the container-based virtualization environment;
determining, by the processor hardware memory management engine based on the first candidate access identifier and the first access identifier, a hardware-based memory protection response operation which pertains to the first portion of the memory component associated with the container-based virtualization environment;
carrying-out, by the processor hardware memory management engine, the hardware-based memory protection response operation which pertains to the first portion of the memory component associated with the container-based virtualization environment;
configuring, using the kernel process to manage access authority of the first user process to the memory component associated with the container-based virtualization environment, a group of hardware registers which have the set of access identifiers;
determining, by the processor hardware memory management engine based on the first candidate access identifier and the first access identifier of a first hardware register of the group of hardware registers, the hardware-based memory protection response operation which pertains to the first portion of the memory component associated with the container-based virtualization environment;
determining the hardware-based memory protection response operation which pertains to the first portion of the memory component associated with the container-based virtualization environment by the processor hardware memory management engine based on:
the first candidate access identifier,
the first access identifier of the first hardware register of the group of hardware registers, and a second access identifier of a second hardware register of the group of hardware registers; and configuring, using a hypervisor process to manage access authority of one or more processes to the memory component associated with the container-based virtualization environment, the second hardware register which has the second access identifier.

17. A computer program product for hardware-based memory protection of a container-based virtualization environment, the computer program product comprising a computer readable storage medium having program instructions embodied therewith, wherein the computer readable storage medium is not a transitory signal per se, the program instructions executable by a processor to cause the processor to perform a method comprising:

establishing, for hardware-based memory protection of the container-based virtualization environment, a set of access identifiers for a container of a kernel process related to a memory component associated with the container-based virtualization environment;

receiving, by a processor hardware memory management engine, an access request from a first user process to a first portion of the memory component associated with the container-based virtualization environment;

detecting, by the processor hardware memory management engine with respect to the access request, a first candidate access identifier for the first portion of the memory component associated with the container-based virtualization environment;

identifying, by the processor hardware memory management engine, a first access identifier of the set of access identifiers that corresponds to the first portion of the memory component associated with the container-based virtualization environment;

determining, by the processor hardware memory management engine based on the first candidate access identifier and the first access identifier, a hardware-based memory protection response operation which pertains to the first portion of the memory component associated with the container-based virtualization environment;

carrying-out, by the processor hardware memory management engine, the hardware-based memory protection response operation which pertains to the first portion of the memory component associated with the container-based virtualization environment;

configuring, using the kernel process to manage access authority of the first user process to the memory component associated with the container-based virtualization environment, a group of hardware registers which have the set of access identifiers;

determining, by the processor hardware memory management engine based on the first candidate access identifier and the first access identifier of a first hardware register of the group of hardware registers, the hardware-based memory protection response operation which pertains to the first portion of the memory component associated with the container-based virtualization environment;

determining the hardware-based memory protection response operation which pertains to the first portion of the memory component associated with the container-based virtualization environment by the processor hardware memory management engine based on:
the first candidate access identifier,
the first access identifier of the first hardware register of the group of hardware registers, and
a second access identifier of a second hardware register of the group of hardware registers; and configuring, using a hypervisor process to manage access authority of one or more processes to the memory component associated with the container-based virtualization environment, the second hardware register which has the second access identifier.

* * * * *